(12) United States Patent
Drouin et al.

(10) Patent No.: US 9,151,433 B2
(45) Date of Patent: Oct. 6, 2015

(54) PROTECTOR FOR AN OIL EXTRACTION PIPE

(75) Inventors: Alexis Drouin, Toulouse (FR); Thomas Charrue, Vendome (FR); Philippe Choffart, Tours (FR)

(73) Assignee: PREMIUM PROTECTOR, Toulouse (FR)

( * ) Notice: Subject to any disclaimer, the term of this patent is extended or adjusted under 35 U.S.C. 154(b) by 258 days.

(21) Appl. No.: 13/820,128

(22) PCT Filed: Jul. 8, 2011

(86) PCT No.: PCT/EP2011/061703
§ 371 (c)(1),
(2), (4) Date: Jul. 29, 2013

(87) PCT Pub. No.: WO2012/028365
PCT Pub. Date: Mar. 8, 2012

(65) Prior Publication Data
US 2013/0299037 A1 Nov. 14, 2013

(30) Foreign Application Priority Data

Sep. 3, 2010 (FR) ...................................... 10 57020
Dec. 30, 2010 (FR) ...................................... 10 61379

(51) Int. Cl.
*B65D 59/06* (2006.01)
*F16L 57/00* (2006.01)
*E21B 17/00* (2006.01)

(52) U.S. Cl.
CPC ................. *F16L 57/00* (2013.01); *B65D 59/06* (2013.01); *E21B 17/006* (2013.01); *F16L 57/005* (2013.01); *Y10T 29/49826* (2015.01)

(58) Field of Classification Search
CPC ........ F16L 57/005; B65D 59/02; B65D 59/06
USPC .............................................. 138/96 T, 96 R
See application file for complete search history.

(56) References Cited

U.S. PATENT DOCUMENTS

| | | | | |
|---|---|---|---|---|
| 4,020,874 A | * | 5/1977 | Palarino | 138/96 T |
| 4,139,023 A | * | 2/1979 | Turley | 138/96 T |
| 4,157,100 A | | 6/1979 | Turk | |
| 4,337,799 A | * | 7/1982 | Hoover | 138/96 T |
| 4,379,471 A | | 4/1983 | Kuenzel | |

(Continued)

FOREIGN PATENT DOCUMENTS

CN 1704319 A 12/2005

*Primary Examiner* — Patrick F Brinson
(74) *Attorney, Agent, or Firm* — Blakely Sokoloff Taylor & Zafman LLP

(57) ABSTRACT

The invention relates to a protector (1, 7) for an oil extraction pipe. The invention comprises: a hollow, substantially frustoconical connecting segment (2) having a proximal end (21), a distal end (22) and a thread (42) complementary to that of the pipe; and a bumper segment (3) having a connecting end (31) in the extension of the connecting segment (2) and a free end (32), said bumper segment including an internal ring (33) extending in the extension of the connecting segment (2) and an external ring (34) extending coaxially from the connecting segment, defining an internal space between the internal (33) and external (34) rings and increasing the outer diameter of the protector (1, 7). The protector (1, 7) is characterized in that all of the walls thereof having a substantially equal thickness, such that the shape is suitable for production by means of injection, and in that it is produced by means of injection.

12 Claims, 4 Drawing Sheets

(56) References Cited

U.S. PATENT DOCUMENTS

| | | | |
|---|---|---|---|
| 4,662,402 A | 5/1987 | Dreyfuss et al. | |
| 4,796,668 A * | 1/1989 | Depret | 138/96 T |
| 4,957,141 A * | 9/1990 | Dreyfuss et al. | 138/89 |
| 5,195,562 A * | 3/1993 | Dreyfuss et al. | 138/96 T |
| 5,244,015 A * | 9/1993 | Dreyfuss et al. | 138/96 T |
| 6,196,270 B1 * | 3/2001 | Richards et al. | 138/96 T |
| 7,281,546 B2 * | 10/2007 | Goodson et al. | 138/96 T |
| 2004/0200525 A1 * | 10/2004 | Goodson et al. | 137/89 |
| 2004/0201131 A1 * | 10/2004 | Goodson et al. | 264/220 |
| 2006/0266428 A1 * | 11/2006 | Pajaro Gonzalez et al. | 138/96 T |
| 2013/0213516 A1 * | 8/2013 | Clem et al. | 138/96 T |

* cited by examiner

PROTECTOR FOR AN OIL EXTRACTION PIPE

FIELD OF THE INVENTION

The present invention relates to the field of oil extraction pipe protectors, and more specifically protectors for the threads arranged at the ends of said pipes.

STATE OF THE RELATED ART

Oil extraction pipes are used for drilling wells, in order to reach significant depths.

These pipes have, at each of the ends thereof, threads for the interconnection thereof either directly or by means of intermediate elements.

The threaded ends of the pipes are referred to as male ends, whereas the tapped ends of the pipes are referred to as female ends.

According to the practice of those skilled in the art, a protector fitted onto a male end of a pipe is referred to as a male protector (or pin), and a protector fitted onto a female end of a pipe is referred to as a female protection (or box).

Conventionally, these threads were lubricated a first time prior to the storage thereof with so-called storage grease, and again lightly before use, with a lubricant referred to as "operational". This involved significant time consumption for each use of the pipes. Pipes having solid or permanent lubrication means on the threads thereof have thus been proposed, thus with the aim of no longer requiring thread lubrication operations prior to each use of the pipes, the pipes thus being lubricated continuously from the manufacture thereof.

Moreover, oil extraction pipes require protectors to protect the threaded ends thereof, so that the thread is not damaged during storage and handling during pipe transport.

These protectors must meet numerous requirements:
 remaining in position on the pipe despite vibrations due to the transport and handling phases of the pipes,
 remaining in position under highly variable temperature conditions, typically from −46° C. to 66° C.,
 acting as a shock absorber during the various pipe handling steps,
 preventing pollution inside the pipe and the machined areas, i.e. ensuring the tightness of the pipe,
 suitable for being mounted and removed easily,
 enabling testing inside the pipe, commonly referred to as "drift",
 enabling gripping, if required, of the pipe by hooks housed in the ends of the pipe.

The API 5CT standard, also referred to as ISO 11960, defines the requirements to be met by these protectors more specifically.

The use of solid lubricants adds an additional requirement in respect of non-degradation of the lubricant when fitting or removing the protector.

Current solutions propose protectors essentially made of high-density polyethylene (HDPE) and are mainly machined, involving production means such as lathes outside plastics industry standards.

Attempts to produce injection-moulded protectors have been proposed, but have proven to be dissatisfactory in terms of final quality of the product.

In sum, the current solutions do not offer solutions meeting all these requirements while remaining reasonable in terms of cost.

In particular, male protectors do not have a tight connection between the protector and the pipe, whereas female and male protectors have a structure giving rise either to disproportionate costs or to protectors with a low shock resistance. Satisfactory fixation and suitability of the protector for dismantling are not guaranteed throughout the entire temperature range.

DESCRIPTION OF THE INVENTION

The aim of the present invention is that of providing an extraction pipe thread protector suitable for meeting these requirements without incurring excessively high production costs compared to conventional protectors.

The present invention relates to a protector for an oil extraction pipe thread comprising:
 a hollow, substantially frustoconical connecting segment about a central axis, and having a proximal end, a distal end and a thread complementary to that of the pipe,
 a bumper segment having a connecting end and a free end, the connecting end thereof being in the extension of the distal end of the connecting segment, said bumper segment including:
  an internal ring extending coaxially and in the extension of the distal end of the connecting segment, and
  an external ring extending coaxially from the distal end of the connecting segment, defining an internal space between said internal and external rings, and increasing the external diameter of the protector said protector being characterised in that all of the walls of the protector have a substantially equal thickness.

According to one alternative embodiment, the protector comprises longitudinal ribs connecting said internal ring and said external ring, said ribs having a thickness substantially equal to the thickness of the internal and external rings.

According to one alternative embodiment, said protector is produced by means of polycarbonate injection-moulding.

According to one alternative embodiment, the protector further comprises a cap removably mounted in the free end of the bumper segment so as to seal same tightly while enabling the "drift" test of the pipe without removing the protector.

The invention relates to a male alternative embodiment of said protector, wherein:
 said connecting segment has a decreasing diameter from the proximal end thereof to the distal end thereof;
 the thread complementary to the thread of said pipe is arranged inside said connecting segment,
 the internal ring comprises a frustoconical portion in the extension of the distal end of the connecting segment, and a portion having a hollow cylindrical shape in the extension of said frustoconical portion,
 the external ring has a substantially hollow frustoconical shape, extending from the distal end of the connecting segment, and wherein the diameter increases on moving away from said distal end of the connecting segment, the maximum diameter of said external ring being greater than the diameter of the connecting segment at the proximal end thereof.

According to one particular embodiment, the free end of the protector is bevelled to substantially 45%.

According to a further particular embodiment, the male protector further comprises a polymer film attached on the internal face of the connecting segment, said polymer film being suitable for ensuring the tightness of the connection between the protector and an oil extraction pipe whereon said protector is attached.

The invention also relates to a process for positioning such a male protector comprising steps for:

rolling back a portion of said polymer film on the external face of the connecting segment, positioning the protector on an oil extraction pipe, such that the thread of said pipe and the complementary thread of said protector engage to hold the protector in position on said pipe, rolling out the rolled back portion of the polymer film on said pipe so as to ensure the tightness of the connection between the protector and said oil extraction pipe.

The invention also relates to a female alternative embodiment of said protector, wherein:

said connecting segment has an increasing diameter from the proximal end thereof to the distal end thereof;

the complementary thread to the thread of said pipe is arranged outside said connecting segment, the internal ring is a hollow cylinder, having a diameter equal to the diameter of the connecting segment at the distal end thereof, the external ring comprises a partition extending radially from the distal end of the connecting segment, towards the outside of the protector, and a substantially frustoconical section extending from said partition wherein the diameter increases towards the free end of the bumper segment.

DESCRIPTION OF THE FIGURES

Further features, aims and advantages of the invention will emerge from the description hereinafter, which is merely illustrative and not limiting, and should be read with reference to the appended figures, wherein.

DETAILED DESCRIPTION

Figure 1:
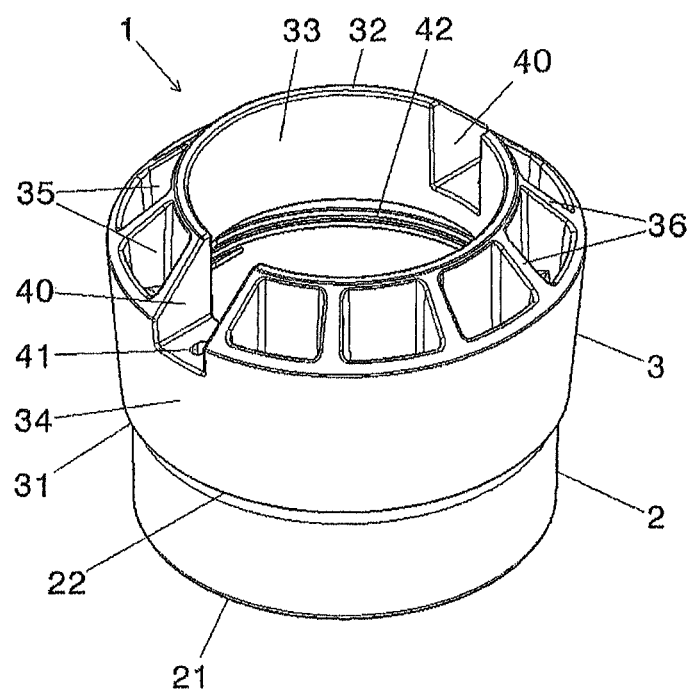
FIG. 1 shows a male alternative embodiment of a protector according to the invention.

Male Protector:

FIG. 1 shows an example of an embodiment of a male protector 1 according to the invention.

The male protector 1 as illustrated can be broken down into two parts:

a connecting segment 2, and a bumper segment 3.

The connecting segment 2 has a proximal end 21 and a distal end 22, and has a substantially frustoconical shape wherein the diameter decreases from the proximal end 21 to the distal end 22.

The bumper segment 3 has a connecting end 31 and a free end 32, the connecting end 31 thereof being in the extension of the distal end 22 of the connecting segment 2.

The bumper segment 3 comprises an internal ring 33 and an external ring 34, these two rings 33 and 34 being concentric and defining an internal space 35 therebetween.

The internal ring 33 as shown comprises a frustoconical portion in the extension of the distal end 22 of the connecting segment 2, and a portion having a hollow cylindrical shape in the extension of said frustoconical portion, the diameter of this cylindrical section being substantially equivalent to the internal diameter of the pipe whereon the male protector is to be positioned.

Figure 3:
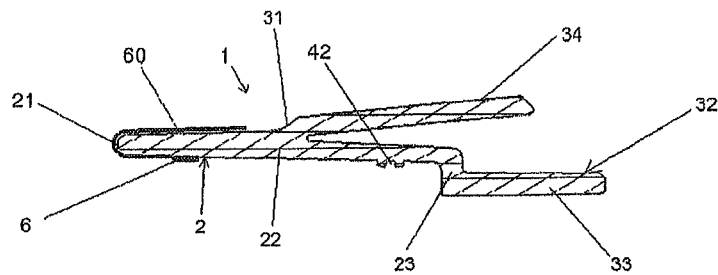
FIGS. 3 and 4 show sectional views of the positioning of such a male protector provided with a polymer film on a pipe.
Figure 3:
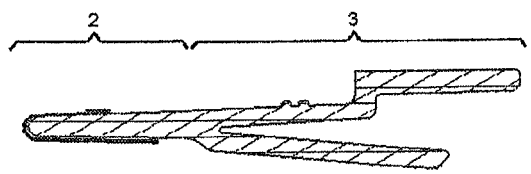

The internal ring 33 is thus typically radially offset with respect to the frustoconical 2 connecting segment 2 and thus typically comprises a connecting partition 23, shown in FIGS. 3 and 4 which are detailed hereinafter, said connecting partition 23 being arranged between the frustoconical portion and the cylindrical portion of the internal ring 33.

The external ring 34 has a frustoconical section, wherein the diameter increases from the connecting end 31 to the free end 32 of the connecting segment 3, the maximum diameter of the external ring 34 being greater than the maximum diameter of the connecting segment 2. The external ring 34 thus typically has an angle of 5° with respect to the axis of the male protector 1.

The male protector 1 illustrated has two grooves 40 extending along a diameter of the male protector 1, from the free end 32.

These grooves 40 are suitable for enabling the insertion of a tool for screwing and unscrewing the protector on a pipe.

Furthermore, these grooves 40 have apertures 41 provided on one of the walls thereof, these apertures 41 being intended to enable the attachment of a substantially circular cap typically blocking off the free end 32 of the male protector 1.

According to one particular embodiment, the internal spaces 35 are filled with resin following the manufacture of the male protector 1. The resin is advantageously transparent, and has an index substantially equal to that of the material from which the protector is formed. Placing resin in this way in the internal spaces 35 of the male protector 1 makes it possible not only to enhance the transparency of the protector 1 due to the index continuity enabled by the resin, but also to substantially enhance the mechanical shock resistance of the protector 1.

Figure 2:
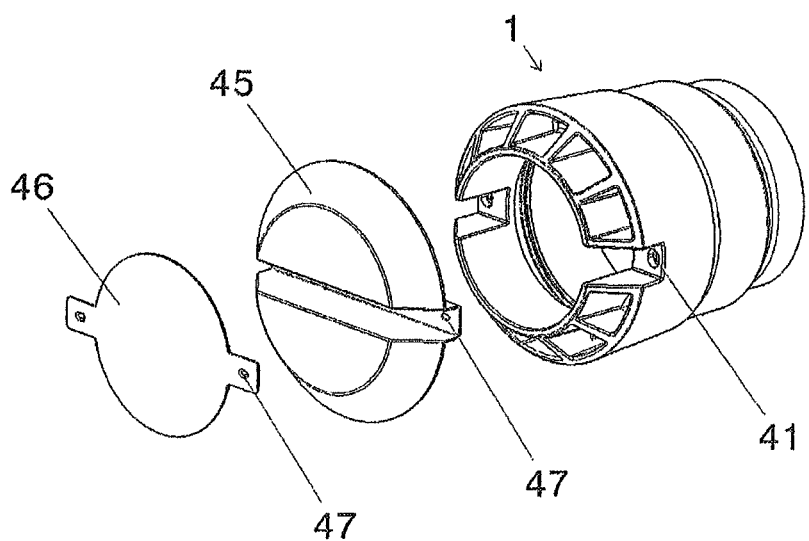
FIG. 2 shows a male protector according to the invention along with two examples of caps for blocking off the free end thereof.

FIG. 2 shows the male protector 1 described above, along with two embodiments of caps 45 and 46 blocking off the end of the protector 1.

In these two embodiments of the caps 45 and 46, the caps comprise complementary projections 47 to the apertures 41 of the male protector 1, so as to be held in position at the free end 32 thereof.

The embodiment 45 of the cap covers the entire free end 32, and has a diameter corresponding to the maximum diameter of the male protector 1.

The embodiment 46 merely blocks off the opening defined by the internal ring 33, and thus has a diameter corresponding substantially to the internal diameter of said internal ring 33.

Further alternative embodiments of caps may be envisaged, particularly alternative embodiments not completely blocking off the opening of the protector, so as to prevent water stagnation in a pipe equipped with perfectly tight protectors.

The caps 45 or 46 are advantageously connected to the body of the protector 1 via connecting means such as a chain, cord or cable, such that the protector 1 and the associated cap cannot be separated.

In the embodiment illustrated, the male protector 1 comprises longitudinal ribs 36 connecting the internal ring 33 and the external ring 34, and thus segmenting the internal space 35 between the internal ring 33 and the external ring 34 into multiple compartments.

As represented in the figure, the male protector 1 comprises twelve longitudinal ribs 36, the sides of each of the grooves 40 are defined by two ribs 36, and the remaining ribs 36 are distributed substantially uniformly between the internal ring 33 and the external ring 34.

As illustrated, the free end 32 of the male protector 1 is bevelled to substantially 45%, resulting in a retraction of the diameter towards the free end 32. This 45% inclination makes it possible to increase the shock resistance of the male protector 1 and thus protect the pipe whereon it is to be mounted more effectively than a protector having a right-angled free end 32.

The male protector 1 further comprises threads 42 arranged at the internal wall of the connecting segment 2, these threads 42 being suitable for engaging with the threads of a pipe whereon said male protector 1 is to be assembled.

The threads 42 of the male protector 1 typically comprise one, two or three turns, with further alternative embodiments being obviously possible.

Having a small number of turns makes it possible to limit the impact on the lubricant of the threads of the pipe that the male protector 1 is intended to protect, this number of turns being however chosen so as to secure the male protector 1 sufficiently on the pipe.

Polymer Film:

The male protector 1 as represented in FIG. 1 is typically associated with a polymer film 60.

This polymer film 60 has a tube shape, and is attached to the male protector 1 using an adhesive or a strip of glue, typically by means of a double-sided adhesive film 6 on the internal face of the connecting segment 2, at an intermediate position between the threads 42 of the proximal end 21 of the connecting segment 2.

The adhesive is chosen such that the attachment of the polymer film 60 on the male protector 1 is permanent, i.e. that the polymer film 60 cannot be removed from the male protector without being damaged, unlike a removable attachment.

Once attached to the male protector 1, the polymer film 60 is rolled back around the proximal end 21 so as to cover the external wall of the male protector 1. FIG. 3 shows a schematic drawing of a male protector 1 equipped with such a polymer film 60 rolled back onto the external wall thereof.

Once the male protector 1 has been positioned on a pipe, this part of the polymer film 60 which had been rolled back onto external face of the male protector 1 is unrolled so as to cover a part of the pipe, typically a length between 15 and 20 cm.

In this way, the polymer film 60 provides the tightness of the connection between the male protector 1 and a pipe whereon it is attached at the proximal end 21 of the male protector 1, the tightness of the connection at the free end 32 of the male protector 1 being provided by a cap not shown in the figures.

Figure 4:
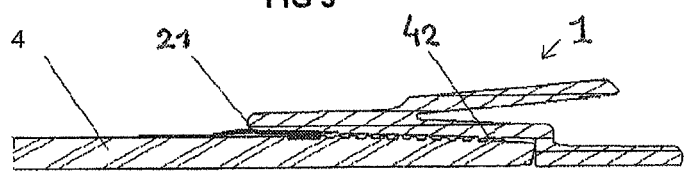
Figure 4:
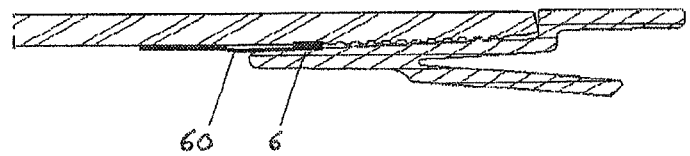

FIG. 4 shows a schematic drawing of a male protector 1 positioned on a threaded pipe 4, the polymer film 60 having been unrolled onto a part of the threaded pipe 4.

The polymer film 60 is typically a multilayer polymer film, formed so as to:
- have a face having a very low adherence, this surface being that intended to come into contact with the pipe, so as to limit friction on the pipe threads when the protector 1 or 7 is removed from the pipe; this very low adherence is typically obtained by adding a slip agent,
- have a face having a very high adherence, this surface being that intended to come into contact with the protector 1 or 7, such that the protector 1 to 7 carries the polymer film 60 following the removal thereof from the pipe.

Moreover, the polymer film 60 is extensile, so as to enable both the rolling back thereof on the protector prior to the positioning of the protector 1 or 7 on the pipe, and the rolling out thereof on the external face of the pipe once the protector 1 or 7 has been positioned on said pipe, while ensuring the tightness of the connection.

Furthermore, the polymer film 60 is made so as not allow tearing, to be very resistant to twisting and shearing, so as not to tear during the screwing or unscrewing of the protector 1 or 7 on the pipe.

The polymer film is typically produced by multilayer film blowing, and has a thickness typically between 1 nm and 1 mm, for example between 15 and 200 µm.

Figure 5:
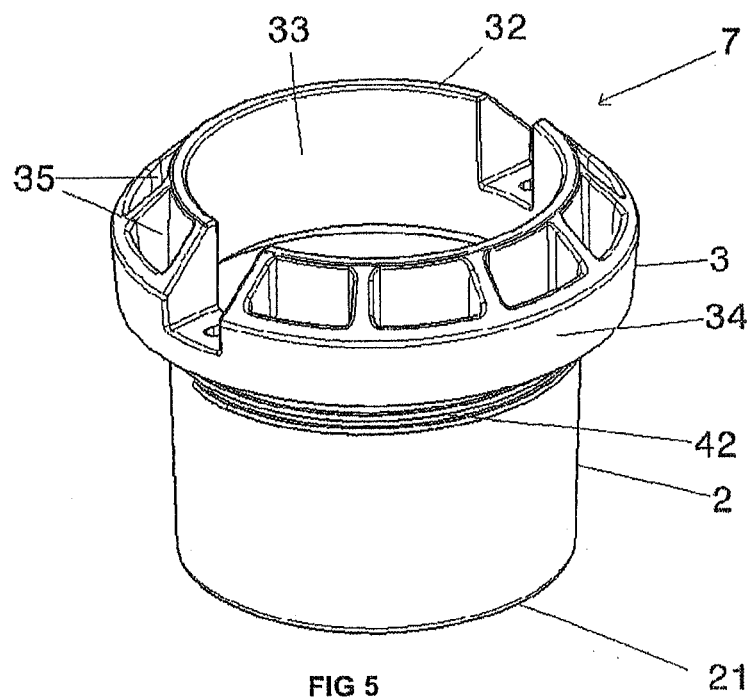
FIGS. 5 and 6 represent two views of a female alternative embodiment of a protector according to the invention.
Figure 6:
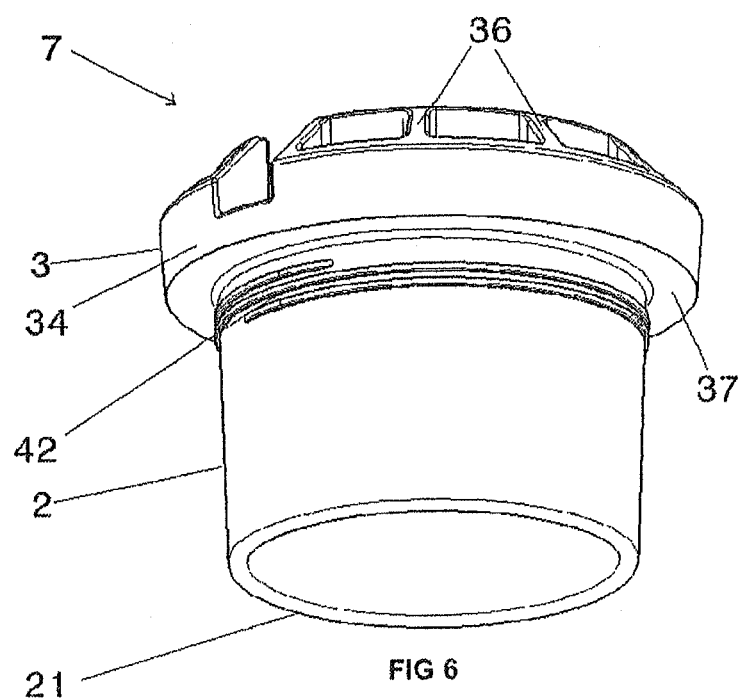

Female Protector:

FIGS. 5 and 6 show two views of a female protector 7 according to the invention, suitable for protecting a female thread on an oil extraction pipe.

As for the male protector 1 shown in FIG. 1, the female protector 7 comprises a connecting segment 2 and a bumper segment 3.

Identical elements to those shown in FIG. 1 are indicated with identical numerical references.

As above, the free end 32 of the female protector 7 is suitable for being sealed tightly by a cap not shown in this figure.

The connecting segment 2 is in this case suitable for being inserted inside the pipe to be protected by the female protector; for a pipe having a given diameter, the diameter of the connecting segment 2 of a female protector 7 would thus be less than the diameter of the connecting segment 2 of a male protector 1.

Furthermore, the threads 42 are in this case arranged on the external face of the connecting segment 2, so as to engage with the threads arranged inside the pipe.

As above, the threads 42 typically comprise one, two or three turns, with further alternative embodiments being possible.

Figure 7:
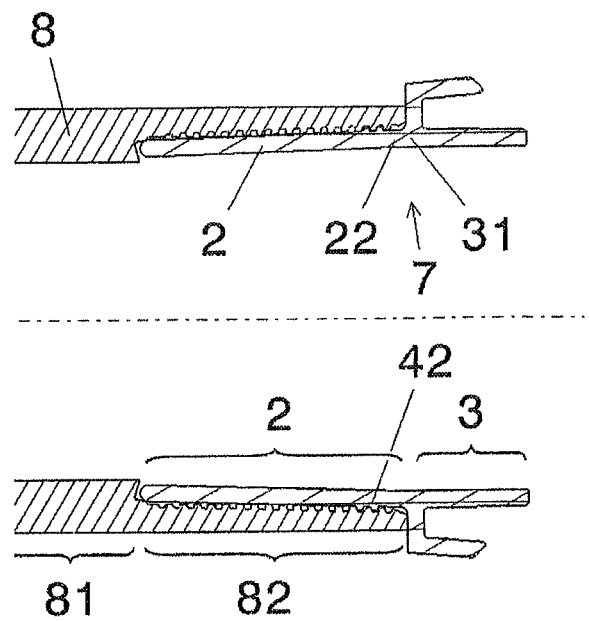
FIG. 7 shows a sectional view of said a female protector positioned on a pipe.

FIG. 7 shows a sectional view of such a female protector 7 according to the invention associated with a female pipe.

This figure reveals the structural difference of the bumper segment 3 of the female protector 7 with respect to that of the male protector 1, due to the difference in diameter of the connecting segment 2.

Indeed, the external ring 34 of the bumper segment 3 must necessarily have a maximum diameter greater than the diameter of the pipe, typically identical to the maximum diameter of the male protector 1 described above, so as to absorb shocks and prevent the application thereof onto the pipe.

In the case of the female protector 7, the connecting segment 2 being positioned in the pipe, the external wall 34 also comprises a partition 37 extending radially with respect to the axis of the female protector 7, and suitable for creating an abutment between the external ring 34 and the connecting segment 2, and thus increasing the external diameter of the external ring 34 so that it is greater than that of the pipe.

Furthermore, the thickness of the connecting segment 2 and the internal ring 33 is typically chosen such that the female protector 7 enables the insertion of means for measuring the internal diameter of the pipe whereon said female protector 7 is to be positioned.

More specifically, FIG. 7 shows an embodiment wherein the pipe has a main section 81 of substantially constant thickness, and a threaded section 82 of reduced thickness, thus having an internal housing wherein the female protector 7 can be positioned to reduce the internal diameter of the assembly to a value less than the diameter of the main section 81 of the pipe.

As for the male protector 1 described above, the internal spaces 35 are filled with resin following the manufacture of the female protector 7. The resin is advantageously transparent, and has an index substantially equal to that of the material from which the protector is formed. Placing resin in this way in the internal spaces 35 of the female protector 7 makes it possible not only to enhance the transparency of the protector 7 due to the index continuity enabled by the resin, but also to substantially enhance the mechanical shock resistance of the protector 7.

Furthermore, as already described for the male protector 1, the female protector 7 may comprise a cap 45 or 46 as shown in FIG. 2, completely or partially blocking off the free end of the protector 7. This cap is in this case advantageously connected to the body of the protector 7 via connecting means such as a chain, cord or cable, such that the protector 7 and the associated cap cannot be separated.

The female protector 7 as shown does not need to be combined with a polymer film to produce a tight connection.

Indeed, in the case of the female protector, the compression of the pipe on the partition 37 when abutted thereon and the contact between the threads of the pipe and the complementary threads 42 of the female protector 7 are sufficient to produce sufficient tightness.

According to one alternative embodiment, the female protector 7 has a seal at the contact between the pipe and the partition 37, typically an O-ring.

According to a further embodiment, the female protector 7 is produced by bi-injection moulding, the abutment area of the pipe on the partition 37 being in this typically made of a more elastic material than the rest of the protector 7, so as to ensure the tightness of the connection.

Figure 8:
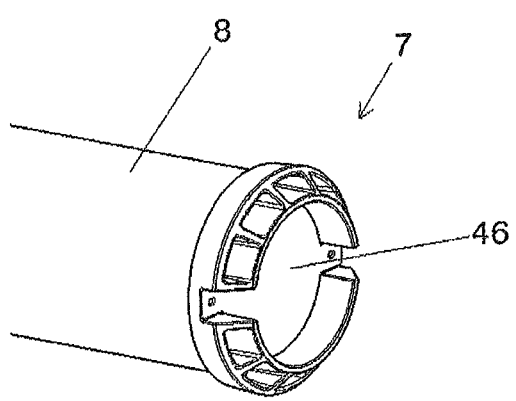
FIG. 8 shows a 3D view of the female protector positioned on a pipe and associated with a cap blocking off the free end.

FIG. 8 shows a view of the female protector 7 according to the invention positioned on a pipe 8, and associated with a cap 46 blocking off the free end 32 thereof.

Manufacture:

The male 1 or female 7 protector is made of polycarbonate by injection-moulding.

The specific geometry of the protector 1 or 7 offers significant advantages for the manufacture thereof by injection-moulding. Indeed, all the walls of the protector 1 or 7 have a substantially equal thickness, including the walls of the bumper segment 3 due to the presence of the ribs 36.

By substantially equal thickness, it is understood that the thickness in areas such as junctions between a plurality of walls of the protector varies by not more than 150%, or advantageously by not more than 100% with respect to the mean thicknesses of the walls of the protectors, typically by not more than 60%.

For example, in the embodiment wherein the walls of the protector 1 or 7 have a thickness of 5 mm, the thickness at the connecting end 31 of the bumper segment 3 is advantageously substantially equal to 8.5 mm, such a difference in thickness over an area having rounded shapes being completely acceptable and suitable for producing the protector by injection-moulding, unlike known examples of protectors having thickness variations of the order of 300%, and wherein the production by means of an injection-moulding process would give rise to prohibitive part cooling times, and significant manufacturing defects.

This substantially constant thickness for the entire male protector makes it possible to:
prevent shrinkage cavities,
reduce the quantity of material required,
reduce the solidification time significantly in relation to an equivalent part where the bumper segment 3 would be produced in a "solid" piece, thus making it possible to reduce machine use considerably by reducing the cycle time for producing the male 1 and female 7 protector, thus making it possible to save energy and obtain a higher production rate.

In this way, the protector 1 or 7 as shown has a lower production cost in relation to a protector having an equivalent overall shape, but wherein the bumper segment 3 is "solid".

Furthermore, all the connections and edges have fillets or curves so that the protector 1 or 7 comprises no sharp angles, favouring mould release by means of these angles, commonly known as draft angles, and preventing sharp angles liable to damage the film and having a significantly negative impact on the manufacture of the protector by injection-moulding.

Polycarbonate is a very high-performance material for producing the protectors 1 or 7, the injection-moulding whereof is enabled due to the specific shape of the protector.

Furthermore, polycarbonate is a transparent material, enabling the user to inspect the condition of the pipe threads whereon the protector 1 or 7 is positioned directly, without the need to remove the protector 1 or 7 to conduct such an inspection.

This easy inspection makes it possible to prevent risks of degradation of the lubrication of the threads of the pipe at each removal and repositioning of the protector 1 or 7.

Furthermore, the protector 1 or 7 is subjected to a surface treatment, so as to perform ultraviolet and/or infrared filtering, such a treatment typically consisting of soaking, followed by microwave plasma treatment in the presence of ozone.

The material from which the protector 1 or 7 is formed, typically polycarbonate, can be chosen so as to have such ultraviolet and/or infrared filtering characteristics.

The solid lubricants used on the pipe threads are indeed ultraviolet- and infrared-sensitive, and thus should be protected therefrom.

In this way, the male 1 and female 7 protectors proposed are suitable for effectively protecting the threaded ends of an oil extraction pipe, by producing a tight connection while enabling the various pipe handling and inspection operations, and retaining a reasonable production cost due to the specifically suitable shape thereof for injection-moulding.

Furthermore, injection-moulding makes it possible to obtain a one-piece protector 1 or 7, having increased mechanical properties compared to protectors produced by associating a plurality of individually produced parts, and significantly reduced production times and costs compared to protectors having non-specific shapes or requiring machining steps for the shaping thereof.

The invention claimed is:

1. Protector for an oil extraction pipe thread, said protector comprises:
a hollow, substantially frustoconical connecting segment about a central axis, and having a proximal end, a distal end and a thread complementary to that of the pipe,
a bumper segment having a connecting end and a free end, the connecting end thereof being positioned as an extension of the distal end of the connecting segment, said bumper segment having:
an internal ring extending coaxially and positioned as a further extension of the distal end of the connecting segment, and
an external ring extending coaxially from the distal end of the connecting segment, defining an internal space between said internal and external rings, and increasing the external diameter of the protector wherein all of the walls of the protector have a substantially equal thickness, and said protector is produced by injection-moulding.

2. Protector according to claim 1, wherein the free end thereof is bevelled to substantially 45%.

3. Protector according to claim 2, wherein said protector includes longitudinal ribs connecting said internal ring and said external ring, said ribs having a thickness substantially equal to the thickness of the internal and external rings.

4. Protector according to claim 1, wherein said protector is produced by polycarbonate injection-moulding.

5. Protector according to claim 1, wherein it further includes a cap removably mounted in the free end of the bumper segment so as to seal same tightly.

6. Protector according to claim 1, wherein:
said connecting segment has a decreasing diameter from the proximal end thereof to the distal end thereof;
the thread complementary to the thread of said pipe is arranged inside said connecting segment,
the internal ring includes a frustoconical portion in the extension of the distal end of the connecting segment, and a portion having a hollow cylindrical shape positioned as an extension of said frustoconical portion,
the external ring has a substantially hollow frustoconical shape, extending from the distal end of the connecting segment, and wherein the diameter increases on moving away from said distal end of the connecting segment, the maximum diameter of said external ring being greater than the diameter of the connecting segment at the proximal end thereof.

7. Protector according to claim 6, wherein said protector further comprises a polymer film attached on the internal face of the connecting segment, said polymer film being suitable for ensuring the tightness of the connection between the protector and an oil extraction pipe whereon said protector is attached.

8. Process for positioning a protector for an oil extraction pipe thread, said protector comprising:
a hollow, substantially frustoconical connecting segment about a central axis, and having a proximal end, a distal end and a thread complementary to that of the pipe,
a bumper segment having a connecting end and a free end, the connecting end thereof being positioned as an extension of the distal end of the connecting segment, said bumper segment having:
an internal ring extending coaxially and positioned as a further extension of the distal end of the connecting segment, and
an external ring extending coaxially from the distal end of the connecting segment, defining an internal space between said internal and external rings, and increasing the external diameter of the protector
wherein all of the walls of the protector have a substantially equal thickness, and said protector is produced by injection-moulding wherein the protector further comprises a polymer film attached on an internal face of the connecting segment, said polymer film being suitable for ensuring the tightness of the connection between the protector and an oil extraction pipe whereon said protector is attached wherein the process comprises steps for:
rolling back a portion of said polymer film on an external face of the connecting segment,
positioning the protector on an oil extraction pipe, such that the thread of said pipe and the complementary thread of said protector engage to hold the protector in position on said pipe,
rolling out the rolled back portion of the polymer film on said pipe so as to ensure the tightness of the connection between the protector and said oil extraction pipe.

9. Protector according to claim 1, wherein:
said connecting segment has an increasing diameter from the proximal end thereof to the distal end thereof;
the complementary thread to the thread of said pipe is arranged outside said connecting segment,
the internal ring is a hollow cylinder, having a diameter equal to the diameter of the connecting segment at the distal end thereof,
the external ring comprises a partition extending radially from the distal end of the connecting segment, towards the outside of the protector, and a substantially frustoconical section extending from said partition wherein the diameter increases towards the free end of the bumper segment.

10. Process for manufacturing a protector for an oil extraction pipe thread, said protector comprising:
a hollow, substantially frustoconical connecting segment about a central axis, and having a proximal end, a distal end and a thread complementary to that of the pipe,
a bumper segment having a connecting end and a free end, the connecting end thereof being positioned as an extension of the distal end of the connecting segment, said bumper segment including:
an internal ring extending coaxially and positioned as a further extension of the distal, end of the connecting segment, and
an external ring extending coaxially from the distal end of the connecting segment, defining an internal space between said internal and external rings, and increasing external diameter of the protector
wherein the walls of the protector have a substantially equal thickness, such that said protector has a shape suitable for production by injection-moulding,
wherein the process comprises an injection-moulding step during which said protector is formed.

11. Protector according to claim 2, wherein said protector is produced by polycarbonate injection-moulding.

12. Protector according to claim 3, wherein said protector is produced by polycarbonate injection-moulding.

* * * * *